3,364,241
PROCESS FOR THE PRODUCTION OF 6α-FLUORO-16α-HALO PREGNANES AND THE INTERMEDIATES THEREFOR
John E. Pike and George B. Spero, Kalamazoo, Mich., assignors to The Upjohn Company, Kalamazoo, Mich., a corporation of Delaware
No Drawing. Filed July 29, 1966, Ser. No. 568,778
7 Claims. (Cl. 260—397.45)

This invention relates to a new chemical process and is more particularly concerned with an improvement in the production of 6α-fluoro-16α-halo steroids of the pregnane series, wherein the halogen is chlorine and fluorine, and with novel intermediates therefor.

Among the many anti-inflammatory steroids known, those having both a 6α- and 16α-halo substituent in a prednisolone-type structure, are most desirable for reason of their high activities.

Thus, the anti-inflammatory activity (Granuloma pouch) can be tabulated as follows:

| Compound: | Anti-inflammatory activity times hydrocortisone |
|---|---|
| 6α,16α-difluoroprednisolone acetate | 104 |
| 6α,9α,16α-trifluoroprednisone acetate | 480 |
| 6α-fluoro-16α-chloroprednisolone acetate | 58 |
| 6α,9α-difluoro-16α-chloroprednisolone acetate | 1,100 |

These compounds, described in U.S. Patents 3,239,544 and 3,137,712, have been obtainable only with difficulties and in low yields. Another method for the synthesis of such products, described in Belgian Patent 656,870 (June 1965), indicates better yields for 16α-chlorinated steroid products, but does not give an improvement in the particular situation in which a 6α-fluoro substituent is desired. In the above cited U.S. Patents, it is necessary to treat a 20(21)-oxido-Δ¹⁶-pregnene having a 6α-fluoro substituent with hydrogen chloride or fluoride and subsequently with an acid anhydride to obtain 6α-fluoro-16-halo-21-hydroxy-17(20)-pregnene as intermediate for the desirable final product. In this reaction, considerable byproducts are obtained, and in addition it involves a difficult and lengthy process to obtain the starting 20(21)-oxido steroid. In the Belgian Patent 656,870, a Favorsky ester, i.e., an 11-keto-17(20)-pregnen-21-oic acid methyl ester is used, which must first be converted to a 16β-hydroxy analog and then to a 16α-halo steroid. The thus-obtained 16α-halo-11-keto-17(20)-pregnen-21-oic acid methyl ester must then be reduced (11-keto to 11β-hydroxy-; 21-carboxylic group to a 21-alcoholic group) in the presence of 6- and 16-halogens. Lithium aluminum hydride eliminates the 16α-chloro substituent, but leaves a 6α-fluoro substituent, diisobutyl aluminum hydride removes 6α-halo substituents, but leaves the 16α-chlorine atom attached. Similarly, other reducing reagents affect the maintenance of the desired two halo substituents, in positions 6 and 16. In addition it was observed that the introduction of a 6-fluorine atom with hydrogen fluoride into a 5α,6α-oxido steroid, after the chlorine was substituted in position 16 and the 17-(acetyl-acetoxy)-sidechain was established, proceeded in very low yield. Consequently, the processes known up till now for the production of 6α-fluoro-16α-halopregnane compounds were rather low in yield.

The present method avoids these low-yield steps and provides a novel method for the production of 6α,16α-halo pregnanes in good yield, which was hitherto not possible.

This novel method and the novel intermediates II and III can be illustratively represented as follows:

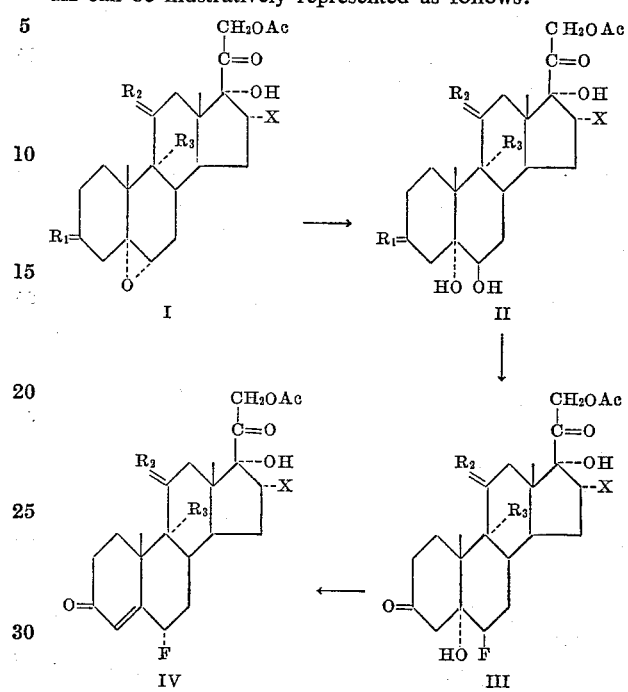

wherein $R_1$ is selected from the group consisting of ketonic oxygen and a cyclic acetal of the formula

in which R is an alkylene radical containing up to 8 carbon atoms, inclusive, and the attaching oxygen to carbon bonds are separated by a chain of at least 2 and not more than 3 carbon atoms; wherein $R_2$ is selected from the group consisting of

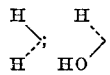

and ketonic oxygen, wherein $R_3$ is selected from the group consisting of hydrogen and fluorine; and wherein together $R_2$ and $R_3$ can represent a 9(11) double bond; wherein X is selected from the group consisting of chlorine and fluorine and wherein Ac is the acyl radical of a hydrocarbon carboxylic acid containing from 2 to 12 carbon atoms, inclusive.

The hydrocarbon carboxylic acids having from 2 to 12 carbon atoms, inclusive, herein referred to comprise in particular the alkanoic acids having from 2 to 12 carbon atoms, e.g., acetic, propionic, butyric, valeric, isovaleric, hexanoic, heptanoic, octanoic, nonanoic, decanoic, undecanoic, dodecanoic acids and the like; phenyl substituted alkanoic acids having up to 12 carbon atoms, e.g., benzoic, phenylacetic, 2- and 3-phenylpropionic, phenylbutyric, phenylvaleric acids and the like; alicyclic acids, e.g., α- and β-cyclopentylpropionic, cyclohexanemonocarboxylic acids; unsaturated acids, such as acrylic, crotonic, 2-butynoic acid, chrysanthemummonocarboxylic acid and the like.

The cyclic acetal group of formula

comprises particularly the group in which R is ethylene, 1,3- and 1,2-propylene; 1,2-butylene; 2,3-pentylene; 1,2-hexylene; 1,2-heptylene; 1,2-octylene and the like.

The process of the present invention comprises: hydrolyzing with a dilute aqueous mineral acid, e.g., perchloric acid, a 5,6-oxido-16α-halo-17α,21-dihydroxypregnan-20-one 21-acylate (I) to obtain the corresponding 5α,6β,17α,21 - tetrahydroxy - 16α-halopregnane-3,20-dione 21-acylate (II); treating II with a fluorinating agent having the Formula V.

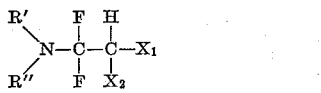

wherein $X_1$ is selected from the class consisting of chlorine and fluorine, $X_2$ is selected from the class consisting of chlorine, fluorine and trifluoromethyl, R' and R" taken individually represent lower-alkyl, and R' and R" taken together with the attached nitrogen atom represent the residue of a heterocyclic radical containing from 5 to 7 ring atoms, inclusive, in an inert organic solvent to obtain the corresponding 5α,17α,21-trihydroxy-6β-fluoro-16α-halopregnane-3,20-dione 21-acylate (III), and treating (III) with a mineral acid to obtain the corresponding 6α - fluoro - 16α-halo-17α,21-dihydroxy-4-pregnene-3,20-dione 21-acylate (IV).

The term "lower-alkyl" means an alkyl radical containing from 1 to 8 carbon atoms, inclusive, such as methyl, ethyl, propyl, butyl, pentyl, hexyl, heptyl, octyl and isomeric forms thereof. The term "heterocyclic radical containing from 5 to 7 ring atoms, inclusive," is inclusive of pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, piperidino, 2-methylpiperidino, 3-methylpiperidino, and like alkylpiperidino groups, hexamethyleneimino, homomorpholino, and the like.

It will be obvious for the person skilled in the art that the products of Formula IV can undergo further chemical reactions, e.g., treatment with selenium dioxide or fermentation with a microorganism such as *Corynebacterium simplex, Septomyxa affinis* and others to establish a 1,2-double bond; treatment with 2,3,5,6-tetrachloro-1,4-benzoquinone (chloranil) to introduce a 6,7-double bond; introduction of a 9α-halogen into a 9α-hydrogen-11β-hydroxy steroid by dehydration to obtain a 9(11)-double bond; converting such compound to the corresponding halohydrin, e.g., with hyprobromous acid, then condensing the halohydrin to the corresponding 9β,11β-oxido compound with a base and finally treating with a hydrogen halide, e.g., hydrogen fluoride to give the corresponding 9α-fluoro-11β-hydroxy steroid.

The object of this invention comprises not only the novel, improved process, useful for the production of 16α-chloro- and 16α-fluoro-6α-fluoropregnanes, but also the novel intermediates of Formulae II and III; and in particular those useful for the production of 6α,9α-difluoro-16α-chloroprednisolone acetate, namely, 5α,6α,11β,17α,21 - pentahydroxy-16α-chloropregnane-3,20-dione 21-acetate and 5α,11β,17α,21-tetrahydroxy-6β-fluoro-16α-chloropregnane-3,20-dione 21-acetate.

The starting compounds for this process are either found in the literature (Belgian Patent 656,870) or are prepared as shown in the preparation.

In carrying out the process of the present invention, a selected starting material of Formula I, dissolved in an organic water-miscible solvent, such as methanol, ethanol, acetone, dioxane, tetrahydrofuran, methyl ethyl ketone and the like, is treated with a dilute aqueous mineral acid such as 5 to 10% aqueous sulfuric acid, hydrobromic acid, perchloric acid, hydrochloric acid, and the like, to give the corresponding 5α,6β,17α,21-tetrahydroxy-16α-halopregnane-3,20-dione 21-acylate. The reaction is generally carried out at room temperature, but may also be carried out at lower or higher temperatures. At room temperature, the reaction proceeds to completion during a period between a ½ hour and 3 hours. After the reaction is completed, the product is obtained by concentrating the reaction mixture, thus removing a large part of the organic solvent, and adding water in which the newly produced product of Formula II is insoluble. The precipitate can be collected on filter and, if desired, may be purified by recrystallization from acetone, ethyl acetate, Skellysolve B hexanes and mixtures thereof and the like.

The fluorination of the thus-obtained 5α,6β,17α,21-tetrahydroxy - 16α - halopregnane-3,20 dione 21-acylate (II) is carried out in an inert organic solvent, that is, a solvent which cannot react with the fluorinating agent. Such solvents comprise methylene chloride, benzene, toluene, chlorobenzene, pentane, hexane, cyclohexane, ethyl acetate, butyl acetate, acetone, methyl ethyl ketone, tetrahydrofuran, ethyl ether, chloroform, carbon tetrachloride, ethylene dichloride, ethylidene chloride, propylene chloride, trimethylene chloride, and the like, with methylene chloride preferred.

Examples of the fluorinating agents having the Formula V are:

N-(2-chloro-1,1,2-trifluoroethyl)diethylamine;
N-(1,1,2,2-tetrafluoroethyl)diethylamine;
N-(2-chloro-1,1,2-trifluoroethyl)dimethylamine;
N-(2-chloro-1,1,2-trifluoroethyl)dipropylamine;
N-(2-chloro-1,1,2-trifluoroethyl)diisobutylamine;
N-(2-chloro-1,1,2-trifluoroethyl)dioctylamine;
N-(2-chloro-1,1,2-trifluoroethyl)methylethylamine;
N-(2,2-dichloro-1,1-difluoroethyl)diethylamine;
N-(1,1,2,3,3,3-hexafluoropropyl)diethylamine;
N-(1,1,2,2-tetrafluoroethyl)diisopropylamine, and the like. The preferred fluorinating agent for use in the process of the invention is N-(2-chloro-1,1,2-trifluoroethyl)diethylamine.

Advantageously, but not necessarily, the process of the fluorination is carried out in the presence of an acid catalyst such as a hydrogen halide, phosphoric acid, sulfuric acid, boron trichloride, boron trifluoride, aluminum trifluoride, titanium tetrafluoride and preferably hydrogen fluoride.

In the preferred embodiment of this invention, the fluorinating reagent is used in an excess such as from 2 to 6 times the molar equivalent for 1 molar equivalent of steroid. The reaction is carried out generally at low temperature between 0–10° C., however, lower or higher temperatures are operative. It is further preferred that the steroid in solution is added in portions over time intervals to the cooled solution of the fluorinating agent and acid catalyst in the organic solvent. The time intervals are selected according to the solubility of the steroid in the reaction mixture, that is, new steroid is only added when the prior addition of steroid has completely gone into solution. When all steroid has been reacted, the mixture is allowed to stir at low temperature for an additional period such as between 1 to 6 hours in order to produce completion of the reaction. After the reaction is completed, the desired product is recovered by conventional means such as destroying the acid catalyst, for example, by adding a sodium bicarbonate solution, separating the water-immiscible phase, that is, the methylene chloride layer in the preferred embodiment of this invention, washing this layer and drying it, and obtaining the product by removal of the solvent by evaporation.

The thus-obtained product, a 5α,17α,21-trihydroxy-6β-fluoro-16α-halopregnane-3,20-dione 21-acetate, can be further purified by conventional means, e.g., chromatography or recrystallization from organic solvents such as acetone, methanol, Skellysolve B hexane mixtures thereof, and the like.

The dehydration step of the thus-obtained 5α,17α,21-trihydroxy-6β-fluoro-16α - halopregnane-3,20-dione 21-acylate (III) is preferably carried out with an acid at low temperatures under water-free conditions. For this purpose, the steroid is dissolved in a water-free organic solvent such as chloroform, carbon tetrachloride, dioxane or the like and treated with a gaseous hydrogen halide, e.g., gaseous hydrogen chloride. The reaction is preferably carried out at low temperature, that is, between −30 and 0° C. for between 1 and 5 hours. The product of the reaction is recovered by conventional means, usually by neutralizing the reaction solution through washing with a dilute base such as sodium bicarbonate and water, drying the solution and evaporating to dryness. The crude product can be purified in conventional manner such as recrystallization, chromatography or the like. The products thus obtained are 6α-fluoro-16α-halo-17α, 21-dihydroxy-4-pregnene-3,20-dione 21-acylates (IV). Depending upon their final purpose, these products can be, as mentioned before, converted to other steroids having halogens in positions 9, double bonds in position $\Delta^{1,2}$ and $\Delta^{6,7}$ or other important substituents particularly the 11β-hydroxy group.

The following preparation and examples are illustrative of the process and products of this invention, but are not to be construed as limiting.

PREPARATION 1

*5α,6α-oxido-11β,17α,21-trihydroxy-16α - fluoro-pregnane-3,20-dione 3-ethylene cyclic acetal 21-acetate*

A solution was prepared containing 5 g. of 16α-fluorohydrocortisone 21-acetate, 6 ml. of distilled ethylene glycol, 0.3 g. of p-toluenesulfonic acid monohydrate and 125 ml. of benzene. This solution was refluxed under stirring for a period of 6 hours in a flask equipped with a reflux condenser and a water trap. The reaction mixture was then cooled, washed repeatedly with water and dilute sodium bicarbonate solution and then dried and concentrated under reduced pressure to dryness. The white crystalline residue obtained was 11β,17α,21-trihydroxy-16α-fluoro-5-pregnene-3,20-dione 3-ethylene cyclic acetal 21-acetate.

To a solution of 5 g. of 16α-fluoro-11β,17α,21-trihydroxy-5-pregnene-3,20-dione 3-ethylene cyclic acetal 21-acetate in 100 ml. of chloroform, was added a solution of 1.7 g. of perbenzoic acid in 35 ml. of chloroform. The resulting solution was allowed to stand in a refrigerator at about 4° C. for a period of 24 hours and thereupon at room temperature (about 25° C.) for an additional period of 72 hours. The resulting reaction mixture was then washed with 5% sodium bicarbonate solution and water, dried over anhydrous sodium sulfate and evaporated to dryness to give a crude solid which was three times recrystallized from acetone to give 5α,6α-oxido-11β,17α,21-trihydroxy-16α-fluoro-pregnane - 3,20 - dione 3-ethylene cyclic acetal 21-acetate.

In the same manner given in the preparation 16α-halo cortisone 21-acylates, which can be substituted with other halogens or groups such as with 9-fluoro, 9-bromo or 9-chloro, 12- or 15-methyl, or Reichstein's substance S 21-acylate can be converted to the corresponding 3-cyclic acetal-5α,6α-oxido- steroids which are useful for this process.

Example 1.—*5α,6β,11β,17α,21-pentahydroxy-16α-chloropregnane-3,20-dione 21-acetate*

A suspension of 10 g. of 5α,6α-oxido-11β,17α,21-trihydroxy-16α-chloropregnane-3,20-dione 3-ethylene cyclic acetal 21-acetate in 600 ml. of acetone and 50 ml. of 7% perchloric acid was stirred for 1.5 hours. The steroid dissolved during a period of 5–10 minutes. The resulting solution was then diluted with 200 ml. of water and concentrated under reduced pressure at 60° C. until the acetone was removed. After the addition of 100 ml. of water and cooling for 2 hours in the refrigerator, the product was isolated by filtration, washed well with water, and dried. A yield of 8.69 g. of 5α,6β,11β,17α,21-pentahydroxy-16α-chloro-pregnane-3,20-dione 21-acetate was obtained, which after recrystallization from acetone had a melting point of 276–277° C. (dec.).

*Analysis.*—Calcd. for $C_{23}H_{33}ClO_8$: C, 58.41; H, 7.03; Cl, 7.50. Found: C, 58.42; H, 7.16; Cl, 7.53.

Example 2.—*5α,6β,11β,17α,21-pentahydroxy-16α-fluoropregnane-3,20-dione 21-acetate*

In the manner given in Example 1, 5α,6α,oxido-11β,17α,21-trihydroxy-16α - fluoropregnane - 3,20 - dione 3-ethylene cyclic acetal 21-acetate was hydrolyzed with 8% aqueous sulfuric acid for a period of 90 minutes in acetone solution. The resulting reaction mixture was treated as before, that is, partially evaporated, diluted with water and the product recovered by filtration. Recrystallization from acetone gave 5α,6β,11β,17α,21-pentahydroxy-16α-fluoropregnane-3,20-dione 21-acetate.

In the manner given in Example 1, other 5α,6β-17α,21-tetrahydro-16α-halopregnane-3,20-dione 21-acylates can be produced by hydrolysis of 5α,6α-oxido-11β,17α-dihydroxy-16α-halo-21-acyloxypregnane-3,20 - dione 21 acylates or the 3-alkylene ketals thereof. Representative compounds thus produced include: 5α,6β,11β,17α,21-pentahydroxy-9α,16α-difluoropregnane-3,20 - dione 21-acetate; 5α,6β,11β,17α,21-pentahydroxy-9α-fluoro - 16α - chloropregnane-3,20-dione 21-acetate; 5α,6β,17α,21 - tetrahydroxy-16α-chloropregnane-3,11,20-trione 21-acetate; 5α,6β,17α,21-tetrahydroxy-9α,16α - difluoropregnane - 3,11,20-trione 21-acetate; 5α,6β,17α,21-tetrahydroxy-9(11)-dehydro-16α-chloropregnane-3,20-dione 21-acetate; 5α,6β,17α,21-tetrahydroxy-9(11)-dehydro-16α - fluoropregnane-3,20-dione 21-acetate and the like.

Example 3.—*5α,11β,17α,21-tetrahydroxy-6β-fluoro-16α-chloro-pregnane-3,20-dione 21-acetate*

A solution consisting of 100 ml. of methylene chloride, 2 ml. of N-(2-chloro-1,1,2-trifluoroethyl)diethylamine and 0.25 ml. of 48% hydrofluoric acid was cooled to a temperature of 0–5° C. To this solution was added with stirring 1.5 g. of 5α,6β,11β,17α,21 - pentahydroxy - 16α chloropregnane-3,20-dione 21-acetate in portions of 0.5 g. The additions were undertaken, each at 2–5 minute intervals, after the previous addition had been completely gone into solution. The mixture was then stirred at a temperature of between 0–5° C. for a total of 3.5 hours. The hydrofluoric acid was destroyed by the addition of 100 ml. of saturated sodium bicarbonate solution and the organic layer (methylene chloride layer) was separated, washed with water, repeatedly, dried and chromatographed over 150 g. of silica gel. The silica gel column was eluted with 300 ml. fractions consisting of 30% ethyl acetate and 70% cyclohexane. Fractions 1 through 13 were discarded. Fractions 14 through 26 were combined and evaporated to give 0.870 g. of product which was crystallized from acetone-Skellysolve B hexanes to give 606 mg. of 5α,11β,17α,21-tetrahydroxy-6β-fluoro-16α-chloropregnane-3,20-dione 21-acetate of melting point 245–246° C. (dec.).

*Analysis.*—Calcd. for $C_{23}H_{32}ClFO_7$: C, 58.16; H, 6.79; Cl, 7.47; F, 4.00. Found: C, 58.04; H, 6.77; Cl, 7.64; F, 3.98.

Example 4.—*5α,11β,17α,21-tetrahydroxy-6β,16α-difluoropregnane-3,20-dione 21-acetate*

In the manner given in Example 3, 5α,6β,11β,17α,21-pentahydroxy-16α-fluoropregnane-3,20-dione 21 - acetate was treated with N-(2-fluoro-1,1,2-trifluoroethyl)diethylamine to give 5α,11β,17α,21-tetrahydroxy-6β,16α-difluoropregnane-3,20-dione 21-acetate.

In the same manner as given in Example 3, other 5α,17α,21 - trihydroxy - 6β - fluoro - 16α - halopregnane- 3,20-dione 21-acylates are produced by reacting a selected 5α,6β,17α,21-tetrahydroxy - 16α-halopregnane-3,20-dione 21-acylate with a reagent of Formula V such as N-(2 - chloro - 1,1,2 - trifluoroethyl)diethylamine. Representative compounds, thus obtained, include: 5α,11β,17α, 21-tetrahydroxy - 6β,9α,16α - trifluoropregnane-3,20-dione 21-acetate; 5α,11β,17α,21 - tetrahydroxy - 6β,9α - difluoro-16α-chloropregnane-3,20-dione 21-acetate; 5α,17α,21-trihydroxy-6β-fluoro-16α-chloropregnane-3,11,20-trione 21-acetate; 5α,17α,21-trihydroxy - 6β,16α - difluoropregnane-3,11,20-trione 21-acetate; 5α,17α,21-trihydroxy-6β,9α-difluoro-16α-chloropregnane-3,11,20-trione 21-acetate; 5α,17α,21-trihydroxy - 6β-fluoro-9(11)-dehydro-16α-chloropregnane-3,20-dione 21-acetate; 5α,17α,21-trihydroxy-6β,16α-difluoro-9(11)-dehydropregnane - 3,20-dione 21-acetate and the like.

*Example 5.—6α-fluoro-16α-chlorohydrocortisone acetate*

A suspension of 1.0 g. of 5α,11β,17α,21-tetrahydroxy-6β-fluoro-16α-chloropregnane-3,20-dione 21-acetate in 120 ml. of chloroform and 0.8 ml. of absolute alcohol was cooled to −10 to −15° C. Hydrogen chloride was bubbled through this mixture for 2½ hours while the temperature was maintained at −10 to −15° C. The reaction mixture was then washed with dilute sodium bicarbonate solution and several times with water, dried over anhydrous sodium sulfate and evaporated to dryness. The residue, thus obtained, was crystallized from acetone-Skellysolve B hexanes to give 642 mg. of 6α-fluoro-16α-chlorohydrocortisone acetate which after additional recrystallization from acetone-Skellysolve B hexanes melted at 254° C. A second polymorphic form of 6α-fluoro-16α-chlorohydrocortisone acetate melted at 238–240° C.

*Analysis.*—Calcd. for $C_{23}H_{30}ClFO_6$: C, 60.45; H, 6.62; Cl, 7.76; F, 4.16. Found: C, 60.30; H, 6.86; Cl, 8.11; F, 4.15.

*Example 6.—6α,16α-difluorohydrocortisone acetate*

In the manner given in Example 5, 5α,11β,17α,21-tetrahydroxy-6β,16α-difluoropregnane - 3,20 - dione 21-acetate was treated with hydrogen chloride gas in methylene chloride solution containing a small amount of ethanol at a temperature between −20 and −10° C. to give 6α,16α-difluorohydrocortisone acetate.

In the manner given in Example 5, other dihalohydrocortisone and cortisone-type compounds of Formula IV including 11-deoxy and 9(11)-dehydro analogs can be obtained by treating the corresponding 5α,17α,21-trihydroxy-6β-fluoro-16α-halopregnane-3,20-dione 21-acylate under anhydrous conditions with hydrogen chloride or hydrogen bromide gas in an anhydrous medium. Representative compounds thus obtained include: 6α-fluoro-16α-chlorocortisone acetate; 6α,16α-difluorocortisone 21-acetate; 6α-fluoro-16α-chloro - 17α,21 - dihydroxy-4-pregnene-3,20-dione 21-acetate; 6α,16α-difluoro-17α,21-dihydroxy-4-pregnene-3,20-dione 21-acetate; 6α-fluoro-16α-chloro - 17α,21 - dihydroxy - 4,9(11) - pregnadiene - 3,20-dione 21 - acetate; 6α,16α - difluoro - 17α,21 - dihydroxy-4,9(11) - pregnadiene - 3,20 - dione 21-acetate; 6α,9α-difluoro-16α-chlorohydrocortisone acetate; 6α,9α,16α-trifluorohydrocortisone acetate; 6α,9α-difluoro-16α-chlorocortisone acetate; 6α,9α,16α-trifluorocortisone acetate and the like.

In the same manner given in the preceding examples, other acylates of the above 6α-fluoro-16α-halopregnanes can be produced by using a starting compound possessing an acyloxy group other than acetoxy. In this manner the propionates, butyrates, isobutyrates, valerates, isovalerates, hexanoates, heptanoates, octanoates, decanoates, laurates, benzoates, phenylacetates, phenylpropionates and the like of the above 6α-fluoro-16α-halopregnanes are obtained.

*Conversion of 6α-fluoro-16α-chlorohydrocortisone acetate to 6α-fluoro-16α-chloroprednisolone acetate*

A mixture of 600 mg. of 6α-fluoro-16α-chlorohydrocortisone acetate, 390 mg. of selenium dioxide, 9 ml. of acetic acid and 42 ml. of t-butyl alcohol was stirred and refluxed for 24 hours, the heat was then turned off and 0.6 g. of magnesium silicate was added. The mixture was stirred for 15 minutes and then filtered, and the filtrate concentrated to give a residue. Purification of the residue gave 6α-fluoro-16α-chloroprednisolone acetate of melting point 290–291° C.

*Analysis.*—Calcd. for $C_{23}H_{28}ClFO_6$: C, 60.72; H, 6.20; Cl, 7.79; F, 4.18. Found: C, 60.62; H, 6.64; Cl, 7.61; F, 4.01.

*Conversion of 6α-fluoro-16α-chloroprednisolone acetate to 6α,9α-difluoro-16α-chloroprednisolone acetate*

A solution of 592 mg. of 6α-fluoro-16α-chloroprednisolone acetate was first treated with 284 mg. of N-bromoacetamide in 8.5 mg. of pyridine for a period of 20 minutes at a temperature of 5–10° C. Thereupon, a stream of sulfur dioxide was passed over the surface of the solution while stirring at a rate as to maintain a temperature below 15° C. After the sulfur dioxide addition was complete (15–20 minutes), water was added and the product obtained by extraction with ether and ethyl acetate. After recrystallization from acetone-Skellysolve B hexanes, 6α-fluoro - 16α - chloro - 17α,21 - dihydroxy-1,4, 9(11)-pregnatriene-3,20-dione 21-acetate of melting point 187–189° C. was obtained. Recrystallization of this material raised the melting point to 191–193° C.

*Analysis.*—Calcd. for $C_{23}H_{26}ClFO_5$: C, 63.22; H, 6.00; Cl, 8.12; F, 4.35. Found: C, 63.51; H, 6.24; Cl, 7.95; F, 4.24.

To a solution of 1.25 g. of 6α-fluoro-16α-chloro-17α,21-dihydroxy - 1,4,9(11) - pregnatriene-3,20-dione 21-acetate and 19.2 ml. of tertiary butyl alcohol was added under stirring 2.8 ml. of 70% perchloric acid in 22 ml. of water; then was added 520 mg. of N-bromoacetamide in 9 ml. of tertiary butyl alcohol. Afteer stirring for 15 minutes, the reaction mixture was diluted with a solution of 520 mg. of sodium sulfite in 29 ml. of water and then concentrated under reduced pressure at 60° C. to give a slurry which was cooled, filtered and the resulting precipitate washed with water and dried. The thus-obtained 6α-fluoro-9α-bromo-11β,17α,21 - trihydroxy - 16α - chloro-1,4-pregnadiene-3,20-dione 21-acetate was obtained in a yield of 1.48 g. having a melting point of 227–230° C. (dec.).

This total material, 1.48 g., of above was dissolved in 100 ml. of acetone, sodium acetate was added (1.48 g.) and the mixture was allowed to stir and reflux for 17 hours. The reaction mixture was then concentrated under reduced pressure and the resulting crude product was purified by chromatography and recrystallization from acetone-Skellysolve B hexanes to give 975 mg. of 6α-fluoro - 9β,11β-oxido-16α-chloro-17α,21-dihydroxy-1,4-pregnadiene-3,20-dione 21-acetate of melting point 210–212° C.

*Analysis.*—Calcd. for $C_{23}H_{26}ClFO_6$: C, 60.99; H, 5.79; Cl, 7.83; F, 4.20. Found: C, 61.07; H, 6.07; Cl, 7.81; F. 4.12.

To 7.28 g. of hydrogen fluoride, cooled in a Dry Ice-ethanol bath, was added 8.85 ml. of precooled tetrahydrofuran followed by a precooled solution of 783 mg. of 6α-fluoro - 9β,11β - oxido-16α-chloro-17α,21-dihydroxy-1,4-pregnadiene-3,20-dione 21-acetate in 22.4 ml. of methylene chloride. The resulting mixture was allowed to stand at 5° C. for 23 hours, was then carefully poured into 200 ml. of crushed ice and water containing 30 g. of sodium bicarbonate. The organic layer was separated and worked up to give 825 mg. of crude material, which after recrystallization from acetone gave 510 mg. of 6α,9α-difluoro-16α-chloroprednisolone acetate having a melting point of 303° C. (dec.) after additional recrystallization from acetone.

We claim:

1. A process for the production of a 6α-fluoro-16α-halo-4-pregnene-3,20-dione acylate of the Formula IV:

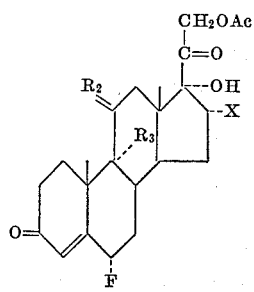

IV wherein R₂ is selected from the group consisting of

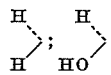

and ketonic oxygen; wherein R₃ is selected from the group consisting of hydrogen and fluorine; and wherein together R₂ and R₃ can represent a 9(11)-double bond; wherein X is selected from the group consisting of fluorine and chlorine and wherein Ac is acyl radical of a hydrocarbon carboxylic acid containing from 2 to 12 carbon atoms, inclusive, which comprises: hydrolyzing with a dilute aqueous mineral acid a 5,6-oxido-16α-halo-17α,21-dihydroxypregnan-20-one 21-acylate of the Formula I:

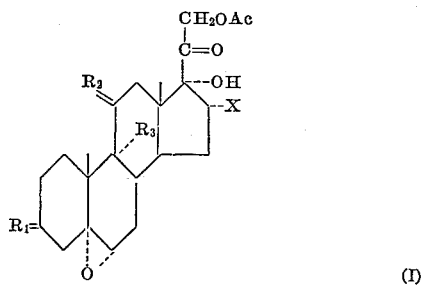

(I)

wherein R₁ is selected from the group consisting of ketonic oxygen and a cyclic acetal of the formula

in which R is an alkylene radical containing up to 8 carbon atoms, inclusive, and the attaching oxygen to carbon bonds are separated by a chain of at least 2 and not more than 3 carbon atoms; and wherein R₂, R₃, X and Ac are defined as hereinabove; to obtain the corresponding 5α,6β,17α,21-tetrahydroxypregnane-3,20-dione 21-acylate of Formula II:

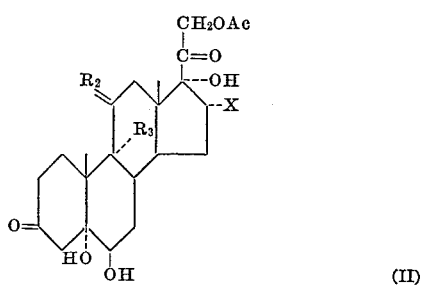

(II)

wherein R₂, R₃, X and Ac are defined as hereinabove; treating Compound II with a fluorinating agent of the Formula V:

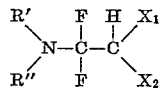

V wherein X₁ is selected from the class consisting of chlorine and fluorine, X₂ is selected from the class consisting of chlorine, fluorine and trifluoromethyl, R' and R" taken individually represent lower-alkyl, R' and R" taken together with the attached nitrogen atom represent the residue of a heterocyclic radical containing from 5 to 7 ring atoms, inclusive, to obtain the corresponding 5α,17α,21-trihydroxy-6β-fluoro-16α-halopregnane-3,20-dione 21-acylate of Formula III:

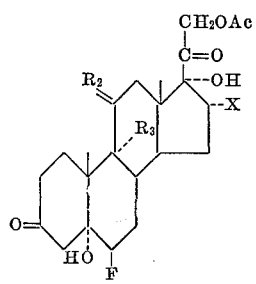

(III)

wherein R₂, R₃, X and Ac are defined as herein above, and dehydrating Compound III with an anhydrous mineral acid to obtain the Compound IV above.

2. A process according to claim 1 for the production of 6α-fluoro-16α-chlorohydrocortisone 21 - acetate which comprises: hydrolyzing with a dilute aqueous mineral acid a 5,6-oxido-16α-chloro-11β,17α,21-trihydroxypregnane-3,20-dione 3-ethylene cyclic acetal 21-acetate to obtain the corresponding 5α,6β,11β,17α,21-pentahydroxypregnane-3,20-dione 21-acetate; treating this compound with a fluorinating agent of the formula:

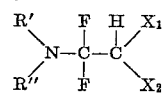

wherein X₁ is selected from the class consisting of chlorine and fluorine, X₂ is selected from the class consisting of chlorine, fluorine and trifluoromethyl, R' and R" taken individually represent lower-alkyl, R' and R" taken together with the attached nitrogen atom represent the residue of a heterocyclic radical containing from 5 to 7 ring atoms, inclusive, to obtain the corresponding 5α,11β,17α,21 - tetrahydroxy - 6β - fluoro - 16α - chloropregnane-3,20-dione 21-acetate and dehydrating this compound with an anhydrous mineral acid to obtain 6α-fluoro-16α-chlorohydrocortisone 21-acetate.

3. The process of claim 2, wherein the dilute aqueous mineral acid for the hydrolysis is dilute aqueous perchloric acid, the fluorinating agent is N-(2-chloro-1,1,2-trifluoroethyl)diethylamine, and the dehydration is carried out with hydrogen chloride gas.

4. A 5α,6β,17α,21-tetrahydroxypregnane-3,20-dione 21-acylate of Formula II:

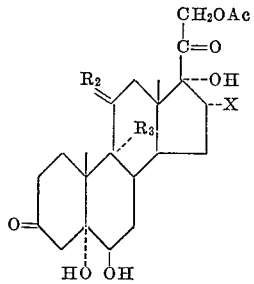

(II)

wherein R₂ is selected from the group consisting of

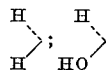

and ketonic oxygen, wherein R₃ is selected from the group consisting of hydrogen and fluorine; and wherein together R₂ and R₃ can represent a 9(11)-double bond; wherein X is selected from the group consisting of fluorine and chlorine and wherein Ac is the acyl radical of a hydrocarbon carboxylic acid containing from 2 to 12 carbon atoms, inclusive.

5. 5α,6β,11β,17α,21 - pentahydroxy - 16α - chloropregnane-3,20-dione 21-acetate.

6. A 5α,17α,21 - trihydroxy - 6β - fluoro - 16α - halopregnane-3,20-dione 21-acetate of the formula:

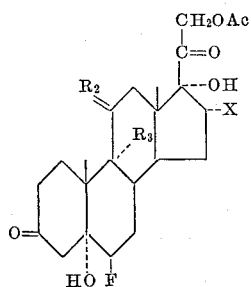

wherein $R_2$ is selected from the group consisting of

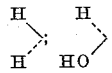

and ketonic oxygen; wherein $R_3$ is selected from the group consisting of hydrogen and fluorine; and wherein together $R_2$ and $R_3$ can represent a 9(11)-double bond, wherein X is selected from the group consisting of fluorine and chlorine and wherein Ac is the acyl radical of a hydrocarbon carboxylic acid containing from 2 to 12 carbon atoms, inclusive.

7. 5α,11β,17α,21 - tetrahydroxy - 6β - fluoro-16α-chloropregnane-3,20-dione 21-acetate.

References Cited

UNITED STATES PATENTS 3,305,546  2/1967  Pike _____ 260—239.55

E. L. ROBERTS, *Primary Examiner.*